US006014568A

United States Patent [19]
Alperovich et al.

[11] Patent Number: 6,014,568
[45] Date of Patent: Jan. 11, 2000

[54] LOCATION-BASED VOICE CODER SELECTION

[75] Inventors: Vladimir Alperovich; Ranjit Bhatia, both of Dallas, Tex.

[73] Assignee: Ericsson Inc., Research Triangle Park, N.C.

[21] Appl. No.: 08/941,129

[22] Filed: Sep. 30, 1997

[51] Int. Cl.[7] .................................................. H04B 1/00
[52] U.S. Cl. ............................................ 455/456; 455/424
[58] Field of Search ....................... 455/427, 432, 455/433, 440, 456, 457, 466, 560, 561, 562, 12.1, 13.1

[56] References Cited

U.S. PATENT DOCUMENTS

| 5,254,986 | 10/1993 | DeLuca | 340/825.44 |
|---|---|---|---|
| 5,327,576 | 7/1994 | Uddenfeldt et al. | 455/33.2 |
| 5,500,648 | 3/1996 | Maine et al. | 455/13.2 |
| 5,561,836 | 10/1996 | Sowles et al. | 455/428 |
| 5,649,299 | 7/1997 | Battin et al. | 455/343 |
| 5,675,628 | 10/1997 | Hokkanen | 455/433 |
| 5,678,182 | 10/1997 | Miller et al. | 455/433 |
| 5,684,859 | 11/1997 | Chanroo et al. | 455/456 |
| 5,711,007 | 1/1998 | Lin et al. | 455/447 |
| 5,713,073 | 1/1998 | Warsta | 455/524 |
| 5,719,918 | 2/1998 | Serbetciouglu et al. | 455/466 |
| 5,812,968 | 9/1998 | Hassan et al. | 704/221 |
| 5,822,318 | 10/1998 | Tiedemann, Jr. et al. | 455/403 |
| 5,842,124 | 11/1998 | Kneagy et al. | 455/418 |

FOREIGN PATENT DOCUMENTS

WO 95/07578  3/1995  WIPO.

OTHER PUBLICATIONS

PCT International Search Report dated Jan. 26, 1999.

*Primary Examiner*—Reinhard J. Eisenzopf
*Assistant Examiner*—Makoto Aoki
*Attorney, Agent, or Firm*—Jenkens & Gilchrist, P.C.

[57] ABSTRACT

A wireless telecommunications system and method for basing the voice coder selection for the speech channel on the current location of the subscriber. Subscribers having a voice coder of less quality, such as a half-rate voice coder, can specify that while making or receiving calls in certain locations, e.g., from home or from the office, an improved voice coder should be allocated, such as the enhanced full rate voice coder. The location based voice coder selection can be implemented in either the mobile station itself or within the cellular network.

14 Claims, 4 Drawing Sheets

LOCATION-BASED VOICE CODER SELECTION

BACKGROUND OF THE PRESENT INVENTION

1. Field of the Invention

The present invention relates generally to telecommunications systems and methods for controlling wireless voice quality, and specifically to location based voice coder selection by the subscriber.

2. Background and Objects of the Present Invention

Cellular telecommunications is one of the fastest growing and most demanding telecommunications applications ever. Today it represents a large and continuously increasing percentage of all new telephone subscriptions around the world. A standardization group, Global System for Mobile Communication (GSM), was established in 1982 to formulate the specifications for mobile cellular radio systems.

With reference now to FIG. 1 of the drawings, there is illustrated a Public Land Mobile Network (PLMN), such as cellular network 10, which in turn is composed of a plurality of areas 12, each with a Mobile Services Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless. The MS may also include a Subscriber Identity Module (SIM) 13, or other memory, which provides storage of subscriber related information, such as a subscriber authentication key, temporary network data, and service related data (e.g. language preference).

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The digital GSM system uses Time Division Multiple Access (TDMA) to handle radio traffic in each cell 22. TDMA divides each frequency (carrier) into eight time slots (physical channels). Logical channels are then mapped onto these physical channels. Examples of logical channels include traffic (speech) channels (TCH) and Control Channels (CCH). However, due to bandwidth limitations, only a limited amount of coded speech can be sent. Therefore, voice coders are used to lower the bit rate for each speech channel.

Furthermore, it is not possible to transmit the speech using conventional encoding methods because the bit rate must be significantly lowered to account for the bandwidth limitations. Therefore, information about the speech, such as filter parameters and the excitation sequence, must be transmitted in addition to the speech encoded at a lower bit rate.

Voice coders perform this operation by filtering the speech signal, calculating the filter parameters, and estimating the excitation in the speech, e.g., toning-toneless noise and the frequency of the vocal cords. What is then transmitted over the air is the filter parameters and the excitation sequence information. These filter parameters and excitation information are then used to recreate understandable speech of good quality, as is understood in the art.

If a relatively high bit-rate can be accepted, good quality can be achieved with simple voice coders of the waveform type. The 64 kbit/s Pulse Code Modulation (PCM) coder is one example. Recent advances in waveform coders have reduced the bit-rate to as low as 16 kbit/s, with future advances potentially lowering it even further.

Another type of speech coder is the vocoder. Vocoders use low bit-rates, and typically produce speech that has a synthetic and metallic tone, due to the reduced sampling rate. This makes it difficult to ascertain the speaker's identity, although the actual words are easily understood.

Hybrid coders, or "soft" vocoders, are more robust than true vocoders. The hybrid approach is a kind of coding that feeds a carefully optimized excitation signal to a linear predictive filter. Hybrid coders adopt many of the efficiencies of traditional vocoding, while following the subtle properties of the speech waveform. The approach uses high quality waveform coding principles to optimize the excitation signal, instead of using the rigid two-state excitation of vocoding.

Low bit-rate coding of voice, whether accomplished by waveform coders, vocoders, or hybrid coders, is critical for accommodating more users on channels that have inherent limitations of bandwidth or power, such as cellular radio or satellite links. As the bit-rate is reduced, quality naturally drops off, unless the complexity of the coding scheme is increased. However, complexity raises the cost, and in many cases, increases the processing delay.

Network operators typically provide incentives, e.g., reduced rates, to subscribers who purchase low bit-rate, e.g., half-rate, channel voice coder usage in order to support more speech channels per time slot. However, in many situations, subscribers who have selected, for example, a low bit-rate, e.g., half-rate, voice coder would prefer to have a high bit-rate, e.g., full-rate, voice coder. For example, if a subscriber is at home or in the office, voice quality may be of more importance than if the subscriber is in the car or out of town. Unfortunately, there is no known method of improving the voice quality based on the location of the subscriber.

It is therefore one object of the invention to allow subscribers to select a voice coder, such as full-rate or half-rate, based on the location.

It is a further object of the invention to store the location-based voice coder selection information within the Mobile Station itself.

It is still a further object of the invention to store the location-based voice coder selection information within the cellular network.

SUMMARY OF THE INVENTION

The present application is directed to telecommunications systems and methods for basing the voice coder selection on the current location of the subscriber. For example, a subscriber may have a very low priority in general, and as a result use the half-rate voice coder in most cases. However, while making or receiving calls in certain locations, e.g., from home or from the office, an improved voice coder can be allocated, such as the enhanced full-rate voice coder. The location-based voice coder selection can be implemented in either the Mobile Station itself or within the cellular network.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
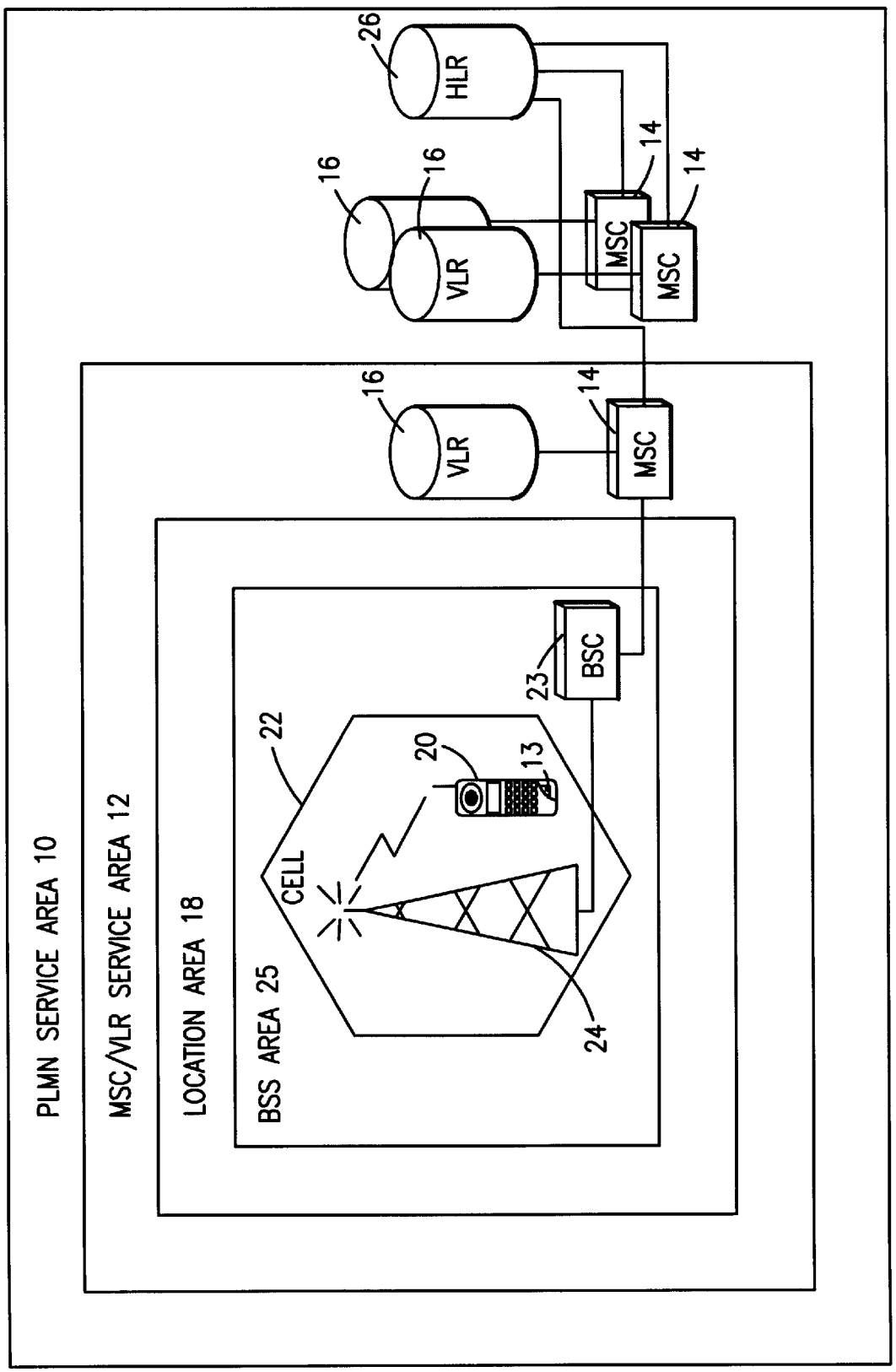
FIG. 1 is a block diagram of a conventional terrestrially-based wireless telecommunications system.
Figure 2:
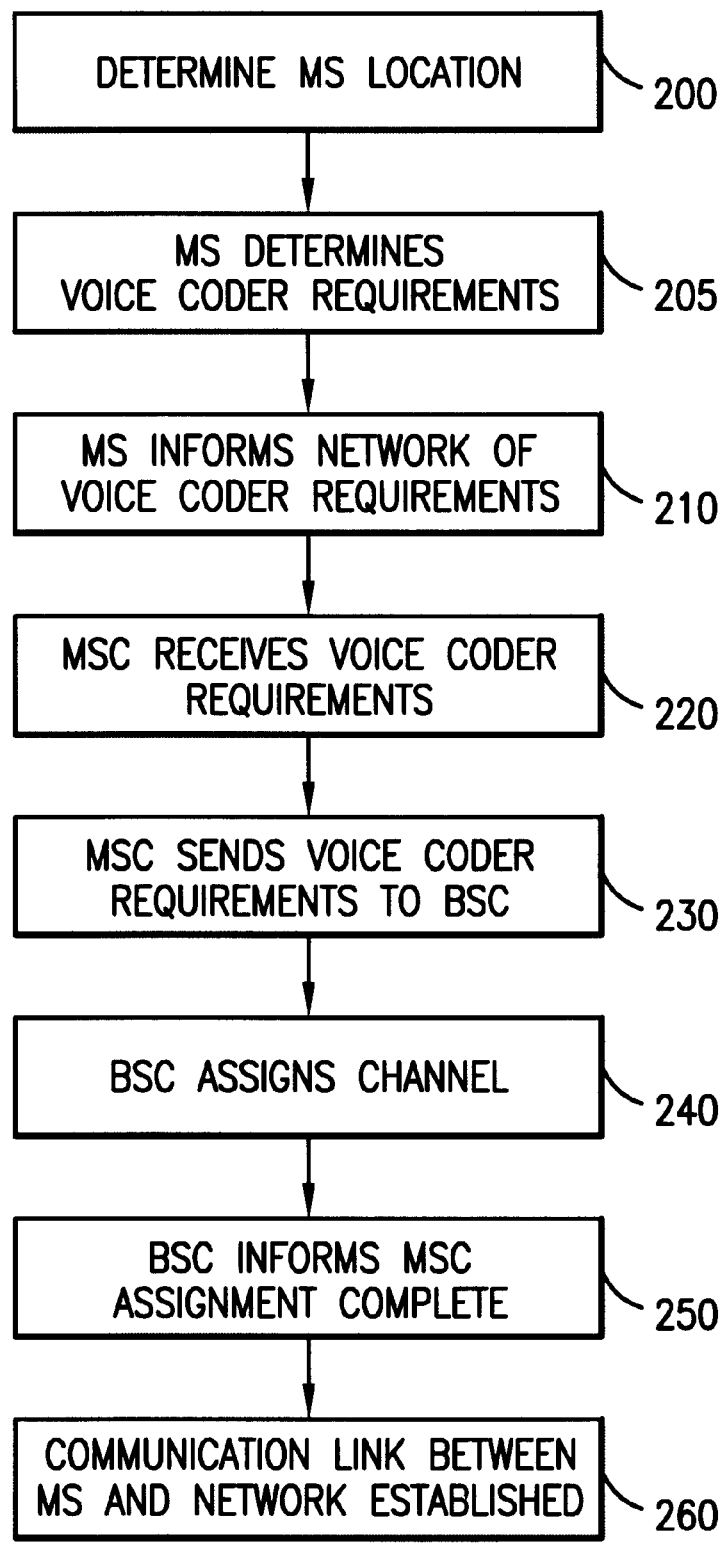
FIG. 2 is a flow chart demonstrating one embodiment of the location-based voice coder selection system of the present invention.

With reference now to FIG. 2 of the drawings, a flow chart illustrating a sample location-based voice coder selection system of the present invention is depicted. As can be seen, during the call setup, after the location of the MS 20 has been determined (step 200), e.g., by the MS 20 registering with the VLR 16 within the service area 12 it is in, the Mobile Station 20 determines its voice coder channel requirements (step 205), such as full-rate channel, half-rate channel, dual-rate channel (full-rate preferred), or dual-rate channel (half-rate preferred), and informs the network 10 of such requirements (step 210). The voice coder channel requirements sent by the MS 20 are either location-based or preset regardless of the location of the MS 20. For the latter situation, the network 10 compares the requirements sent by the MS 20 with the subscription purchased, and alters them accordingly.

This voice coder specification information is carried in the bearer capability information element of the SETUP message, as is well-known in the art. Whereas previously the voice coder specification information contained within the bearer capability information element remained the same regardless of the location of the Mobile Station 20, in embodiments of the present invention, the voice coder specification information changes based on the location of the Mobile Station 20.

The MSC 14 receives this information (step 220) and sends it to the BSC 23 (step 230) in the ASSIGNMENT REQUEST message. The BSC 23 performs the channel allocation (step 240) and returns the ASSIGNMENT COMPLETE message to the MSC 14 (step 250), all such aforementioned messages being well-known in the art. Once the assignment is performed, the communication link between the MS 20 and the network 10 can be established (step 260).

The terms "full-rate channel" and "half-rate channel" are used herein to describe generally two different voice coders having different bit-rates. For example, the full-rate channel could refer to a 9.6 kbit/s channel, while the half-rate channel could refer to only a 4.8 kbit/s channel, thus allowing two speech channels per time slot. However, depending on the system, e.g., GSM, the full-rate channel bit-rate varies according to the maximum bit-rate presently used by that system. Likewise, the half-rate channel bit-rate is not limited to half of the full-rate channel bit-rate, but can instead be any bit-rate which is less than the full-rate channel bit-rate, e.g., one-half, one-fourth, one-eighth, etc., that also increases the capacity on the system.

Even though modern voice coders enjoy lower bit-rates without significant decreases in voice quality, many subscribers would still prefer to use higher bit-rates, which utilize increased sampling rates, especially within certain areas, to ensure good voice quality. In order to accommodate more subscribers, network operators, on the other hand, would prefer to allocate more speech channels per time slot, which requires a lower bit-rate for each speech channel. By offering a reduced rate to subscribers who purchase the half-rate channel (low bit-rate) voice coder preference, e.g., dual-rate with half-rate preferred, but allowing for the use of full-rate channel voice coders, e.g., dual-rate with full-rate preferred, in specified locations, the needs of both the operator and the subscriber can be met.

Figure 3A:
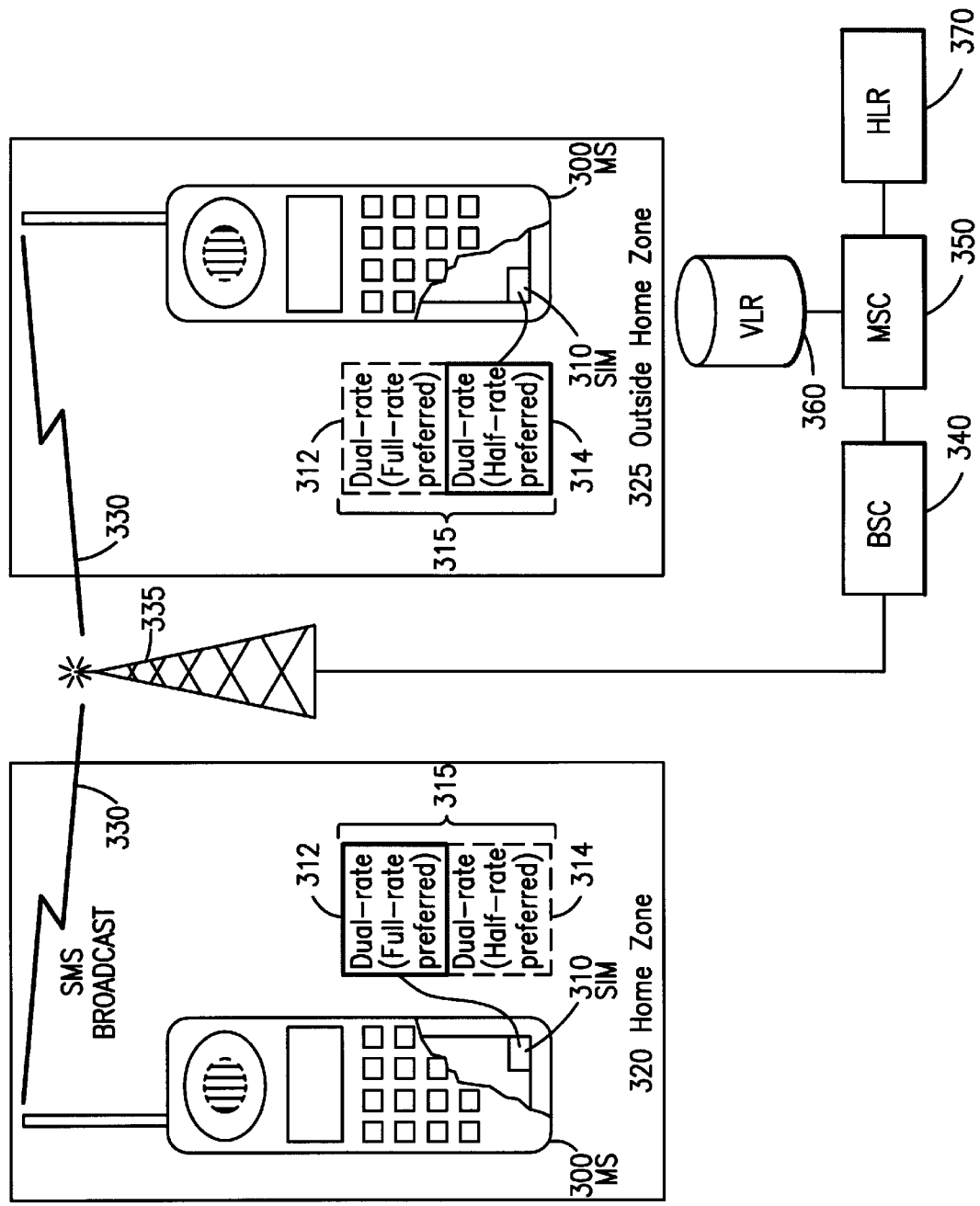
FIGS. 3A and 3B are block diagrams illustrating both the MS-housed and the network-housed embodiments of the present invention.

There are two main methods of implementing this feature, one network-based and the other MS-based. As shown in FIG. 3A of the drawings, the Subscriber Identity Module 310 of the MS 300 can store the voice coder location preference information 315, for example, as fields within a database, including a location and a corresponding voice coder preference, for the MS-housed location-based voice coder selection system. For example, the MS may have one set of voice coder channel requirements for the home zone 320, and another one for outside the home zone 325. Alternatively, the MS can store the voice coder location information data based on a PLMN or cell basis.

Some Mobile Stations 300 can only be operated if a valid Subscriber Identity Module (SIM) 310 is present. The SIM 310 provides storage of subscriber related information, such as data fixed before the subscription is sold, temporary network data, and service related data. For example, the SIM 310 contains information regarding the location of the MS 300, which is updated after each call termination and when the MS 300 has been correctly deactivated. Therefore, during the call setup, the MS 300 determines its location in the network (here either 320 or 325) based on the information from the Short Message System (SMS) broadcast channel 330 from the BTS 335. Information such as the cell identity may be obtained from the regular broadcast channel, not shown.

Based on this location information, the SIM 310 selects the voice coder location information data 315 from its memory and includes it in the SETUP message. For example, while in the home zone 320 it may indicate dual rate (full-rate preferred) 312, and while outside the home zone 325 it may indicate dual rate (half-rate preferred) 314. The MSC 350 will receive this data and make the appropriate request for the radio resources allocation in the BSC 340.

Figure 3B:
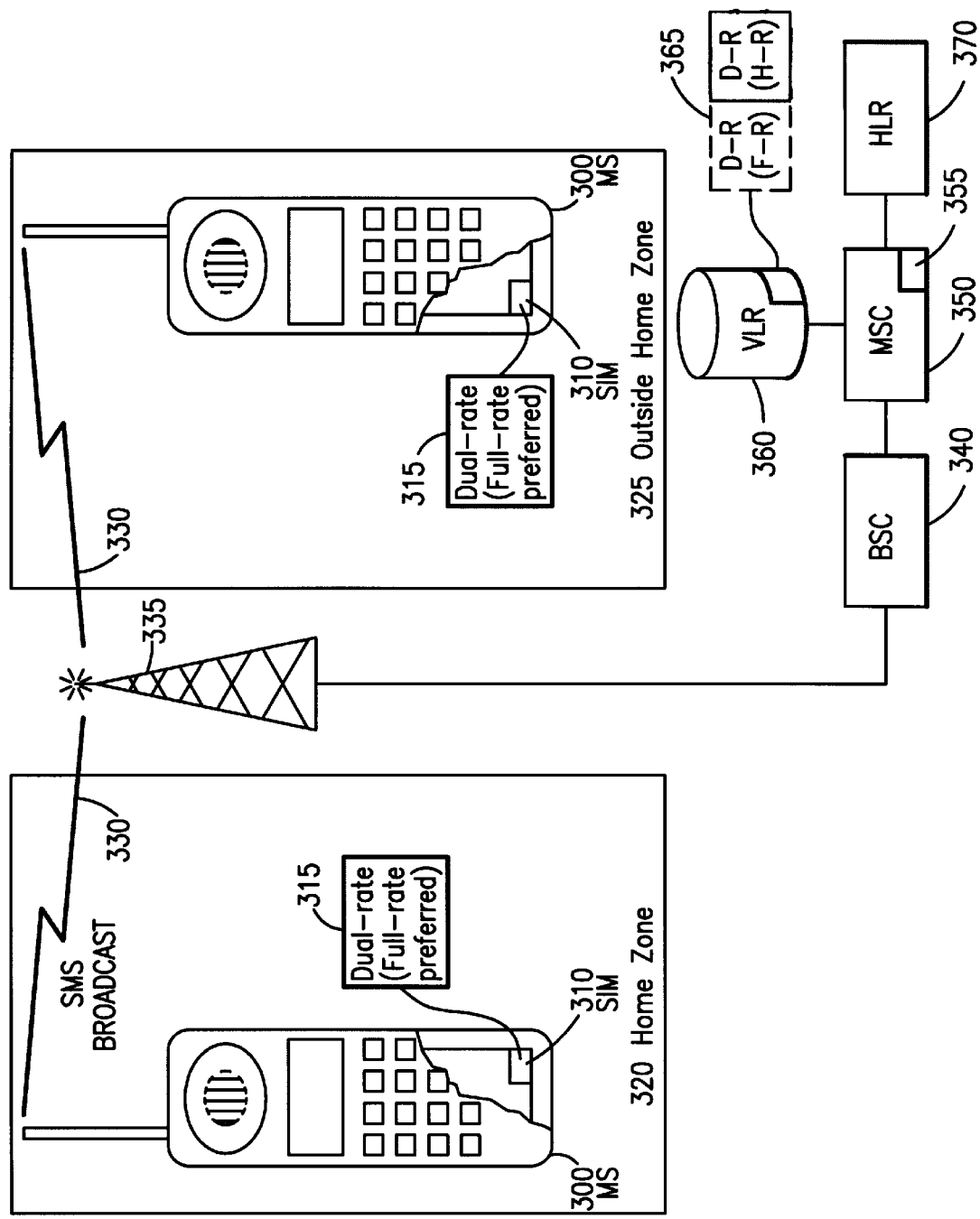

In an alternative embodiment, as illustrated in the block diagram of FIG. 3B, the SIM 310 makes the same request 315 regardless of the position of the MS 300 in the network (either 320 or 325). When the request is received in the MSC/VLR 350/360, a Voice Coder Application 355 within the MSC 350 checks the current location (320 or 325) of the subscriber. The information regarding the current location (320 or 325) is received, for example, in the CM SERVICE REQUEST message or the PAGING RESPONSE message. These messages are encapsulated, for example, in the COMPLETE LAYER 3 message, from the BSC 340 to the MSC 350, as is well-known in the art.

Depending on the location (320 or 325), the radio channel requirements 315 may be modified by the MSC/VLR 350/360 based on the voice coder location information data for that subscriber 365 stored in the VLR 360. For example, if the MS 300 indicates dual rate (full-rate preferred) 314, but the subscriber is outside the home zone 325, the Voice Coder Application 355 within the MSC will check the voice coder location information 365 stored in the VLR, modify the voice coder to dual rate (half-rate preferred), and forward this information to the BSC 340, if the subscriber has purchased a subscription with the dual rate (full-rate preferred) in the home zone 320 and dual rate (half-rate preferred) outside of the home zone 325. The radio channel requirements 315 on a per area basis will be stored in the HLR 370 and forwarded to the MSC/VLR 350/360, for example, in the INSERT SUBSCRIBER DATA message, together with all other subscriber data.

As will be recognized by those skilled in the art, the innovative concepts described herein can be modified and varied over a wide range of applications, and accordingly the scope of patented subject matter is not limited by any of the specific exemplary teachings given.

What is claimed is:

1. A telecommunications system for selecting a voice coder, said system comprising:
   a mobile terminal having a memory therein containing voice coder location information for said mobile terminal, said voice coder location information including at least one location and an associated voice coder preference defined by a mobile subscriber associated with said mobile terminal, said mobile terminal determining a position of said given mobile terminal within said system and comparing said determined position with said at least one location within said voice coder location information to determine a select one of said at least one location; and
   a Mobile Services Center in wireless communication with said mobile terminal for receiving said voice coder preference associated with said select location from said mobile terminal and selecting said voice coder associated with said received voice coder preference for communication between said Mobile Services Center and said given mobile terminal.

2. The telecommunications system of claim 1, wherein said voice coder is selected from the group consisting of: a full-rate channel voice coder, a half-rate channel voice coder, a dual-rate channel voice coder with full-rate preferred, and a dual-rate channel voice coder with half-rate preferred.

3. The telecommunications system of claim 1, wherein said given mobile terminal has a Subscriber Identity Module therein, said memory being located in said Subscriber Identity Module.

4. The telecommunications system of claim 1, wherein said voice coder is a full-rate channel voice coder when said given mobile terminal is within a first area, and said voice coder is a half-rate channel voice coder when said given mobile terminal is within a second area.

5. The telecommunications system of claim 1, further comprising a Base Station System in wireless communication with said mobile terminal and connected to said Mobile Services Center, said Base Station System sending area information to said mobile terminal, said mobile terminal comparing said area information with said at least one location within said voice coder location information to determine said select location and sending the respective voice coder preference associated with said determined select location to said Mobile Services Center.

6. The telecommunications system of claim 5, wherein said Base Station System sends said area information to said given mobile terminal on a Short Message System broadcast channel.

7. The telecommunications system of claim 5, wherein said area information received by said given mobile terminal is stored in a Subscriber Identity Module located within said mobile terminal.

8. A method for selecting a voice coder based on the location of a given one of a plurality of mobile terminals, each of said mobile terminals being in wireless communication with a Mobile Services Center within a telecommunications system, said method comprising the steps of:
   (a) determining a position of said given mobile terminal within said system;
   (b) comparing, by said given mobile terminal, said position with at least one location within voice coder location information associated with said given mobile terminal, said voice coder location information being stored in a memory within said given mobile terminal and including said at least one location and an associated voice coder preference defined by a mobile subscriber associated with said given mobile terminal;
   (c) determining a select one of said at least one location based upon said step of comparing:
   (d) sending the respective voice coder preference associated with said determined select location from said given mobile terminal to said Mobile Services Center; and
   (e) assigning, by said Mobile Services Center, said voice coder associated with said respective voice coder preference associated with said determined select location of said given mobile terminal.

9. The method of claim 8, wherein said memory comprises a Subscriber Identity Module, said steps of comparing and determining said select location being performed by said Subscriber Identity Module.

10. The method of claim 8, wherein said voice coder is selected from the group consisting of: a full-rate channel voice coder, a half-rate channel voice coder, a dual-rate channel voice coder with full-rate preferred, and a dual-rate channel voice coder with half-rate preferred.

11. The method of claim 8, wherein said voice coder is a full-rate channel voice coder when said given mobile terminal is within a first area, and said voice coder is a half-rate channel voice coder when said given mobile terminal is within a second area.

12. The method of claim 8, wherein said step of determining said position of said given mobile terminal is performed by a Base Station System in wireless communication with said given mobile terminal sending area information to said given mobile terminal, said given mobile terminal comparing said area information with said at least one location within said voice coder location information to determine said select location and sending the respective voice coder preference associated with said determined select location to said Mobile Services Center.

13. The method of claim 12, wherein said Base Station System sends said area information to said given mobile terminal on a Short Message System broadcast channel.

14. The method of claim 12, wherein said area information received by said given mobile terminal is stored in a Subscriber Identity Module located within said given mobile terminal.

* * * * *